G. MUTZ.
MOUSE TRAP.
APPLICATION FILED OCT. 4, 1916.
1,214,060.
Patented Jan. 30, 1917.
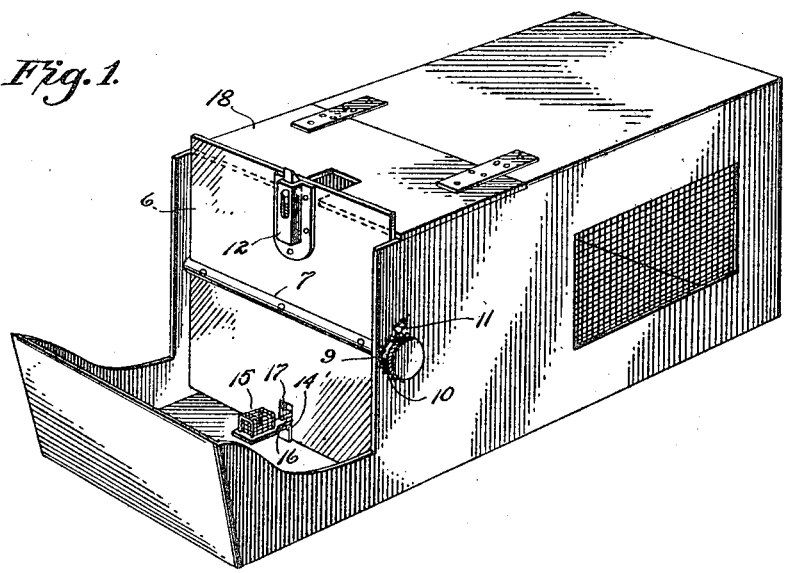
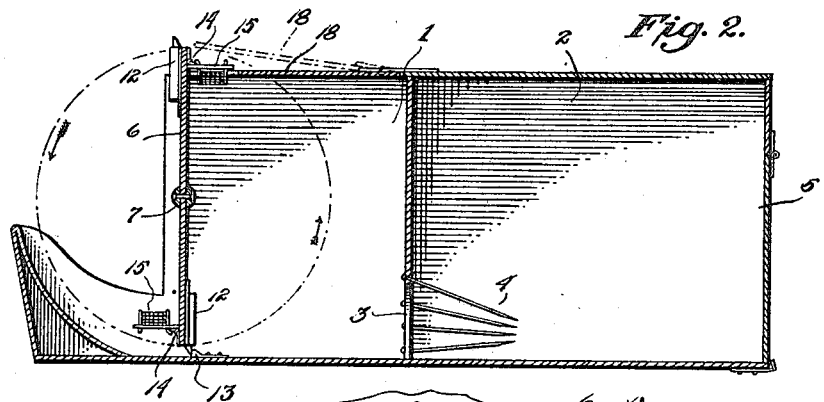
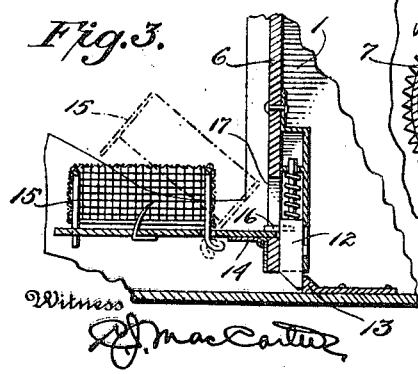
Inventor
George Mutz
By R. Morgan Elliott & Co.
Attorneys

UNITED STATES PATENT OFFICE.

GEORGE MUTZ, OF PITTSBURGH, PENNSYLVANIA.

MOUSE-TRAP.

1,214,060.  Specification of Letters Patent.  Patented Jan. 30, 1917.

Application filed October 4, 1916. Serial No. 123,760.

*To all whom it may concern:*

Be it known that I, GEORGE MUTZ, subject of the Emperor of Austria-Hungary, residing at Pittsburgh, in the county of Allegheny and State of Pennsylvania, have invented certain new and useful Improvements in Mouse-Traps, of which the following is a specification.

This invention relates to mouse traps.

The object of the invention is to provide a trap having a normal form of door, which will not only normally seal ingress to or egress from the trap but will act as an automatic means to propel a mouse within the body of the trap and there hold it against escape.

Generally stated, the trap consists of a body including two chambers or compartments one of which temporarily receives the mouse after the latter has been propelled therein by the door, and the latter to retain the mouse until removed for the purpose of destruction. Combined with the door are two oppositely disposed latches, that are spring-pressed and are disposed on diametrically opposite sides of the door so that one will always be in a position to hold the door in locked position. The door is actuated by a coiled spring that is released in a step by step motion when the bait box is depressed by the mouse, the said box operating to release the latch.

Further and more specific details of construction will be hereinafter more fully described and claimed.

In the accompanying drawing, forming a part of this specification and in which like characters of reference indicate corresponding parts: Figure 1 is view in perspective of a mouse trap constructed in accordance with the present invention. Fig. 2 is a vertical longitudinal sectional view through the trap taken a little to one side of the center. Fig. 3 is a fragmentary detail view on an enlarged scale showing the manner in which the bait box operates to release the retaining latch of the door. Fig. 4 is a vertical longitudinal sectional view through the spring casing, showing the spring for actuating the door. Fig. 5 is a view in vertical transverse section through the spring casing.

Referring to the drawing, there is exhibited a casing or housing embodying two chambers 1 and 2, the first of which receives the caught mouse and the second serves as a prison wherein the mouse is confined until removed, communication between the two chambers being established by an opening 3 surrounded by inward converging spurs 4 that will permit the mouse to enter the compartment 2 but prevent his escape therefrom. The chamber 2 is provided with a door 5 through which the mouse is removed.

The front of the chamber 1 is closed by a door 6 which is carried by a transverse shaft 7 having its ends journaled in the walls of the chamber 1. On the outer extremity of the shaft at one side of the chamber is secured a coil spring 8 one end of which, as clearly shown in Fig. 5 is secured to the shaft 7, the other end being secured to the wall of the spring casing 9 provided with ratchet teeth 10 that are engaged by a pawl 11 pivoted to the casing and serving to retain the spring under tension, the spring being wound by revolving the casing 9, as will be understood by reference to Fig. 1.

Secured at diametrically opposite sides or ends of the door 6 and in opposite relation are two spring pressed latches 12 that are designed alternately to engage with a stop 13 secured to the floor of the chamber 1. Pivotally secured to the door by hinges 14 are bait boxes 15 that are preferably of foraminous material, in order to prevent the surreptitious removal of the bait without springing the latch, each of the latter being provided with an extension or stud 16 that is engaged by the inner end of the floor of the bait box, the latter being reduced and projected through an opening 17 formed in the door 6.

All of the parts of the device are constructed with a view to cheapness, durability, and minimum danger of derangement in use, and to facilitate cleansing of the chamber 1 a hinged cover 18 is provided for the purpose. It will also be observed that this hinged door 18 has another and important function. As can be seen by reference to Fig. 2 the door is lifted by the revolving door 6 every time the trap is released and immediately falls back behind the upper edge of the door 6 so that unless the door 18 is lifted the door 6 cannot be rotated in a backward direction. This is important, as otherwise the running down of the spring might permit an animal to readily push his way out especially if he did not pass the prongs 4.

In operation, the bait boxes are lured with a suitable bait, after which the spring 8 is wound in order to store energy to actuate the door 6. One or the other of the latches 12 will now be in engagement with the stop 13 and hold the door against turning. Should a mouse climb onto the lower bait box, its weight will instantly release the latch 12, whereupon the door 6 will swing upon its shaft and propel the mouse into the chamber 1 where it will be imprisoned, and from whence it may be removed through the door 18 or from the chamber 2 as the case may be.

What is claimed is:

A mouse trap comprising a casing, a door normally closing one end of the casing, a shaft journaled in the walls of the casing and to which the center of the door is secured, spring actuated means for revolving the door, oppositely disposed latches carried by the opposite ends of the door, a stop carried by the floor of the casing and arranged in the path of travel of the latches, bait boxes pivoted to opposite sides of the door, means connecting the latches and the bait boxes, whereby upon pressure being applied to the latter the latches will be sprung, said casing having a hinged door in the top thereof lying in the path of the edge of the revolving door and arranged to lift as the revolving door revolves and drop back therebehind to prevent backward rotation of said revolving door.

In testimony whereof I affix my signature in presence of two witnesses.

GEORGE MUTZ.

Witnesses:
JOHN ZIELINSKI,
JOHAN CHICHOWSKI.

Copies of this patent may be obtained for five cents each, by addressing the "Commissioner of Patents, Washington, D. C."